United States Patent
Gao et al.

(10) Patent No.: US 12,101,383 B1
(45) Date of Patent: Sep. 24, 2024

(54) SYSTEMS AND METHODS FOR PRIORITIZING DIGITAL SOCIAL MEDIA POSTS WITHIN A SOCIAL MEDIA INTERFACE

(71) Applicant: Meta Platforms, Inc., Menlo Park, CA (US)

(72) Inventors: Yuanrui Gao, Seattle, WA (US); Padmaneha Tamma Reddy, New York, NY (US); Sen Yang, Mercer Island, WA (US); Zihao Zhou, Seattle, WA (US); Hangcheng Zheng, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/148,971

(22) Filed: Dec. 30, 2022

Related U.S. Application Data

(60) Provisional application No. 63/396,477, filed on Aug. 9, 2022.

(51) Int. Cl.
   *G06F 15/173* (2006.01)
   *G06Q 50/00* (2012.01)
   *H04L 67/50* (2022.01)

(52) U.S. Cl.
   CPC .......... *H04L 67/535* (2022.05); *G06Q 50/01* (2013.01)

(58) Field of Classification Search
   None
   See application file for complete search history.

(56) References Cited

U.S. PATENT DOCUMENTS

| | | | |
|---|---|---|---|
| 11,409,409 B1* | 8/2022 | Sicora | G06F 3/0482 |
| 2017/0220652 A1* | 8/2017 | Kazi | G06F 16/24578 |
| 2018/0240147 A1* | 8/2018 | Stevens | G06Q 30/0244 |
| 2020/0329005 A1* | 10/2020 | Anerella | H04L 51/224 |

\* cited by examiner

*Primary Examiner* — Wing F Chan
*Assistant Examiner* — Andrew Woo
(74) *Attorney, Agent, or Firm* — Greenberg Traurig, LLP

(57) ABSTRACT

The disclosed systems and methods may include (1) identifying social media posts that have been posted to a social media platform by a creator account with fewer than a designated number of followers, (2) creating a social-engagement score for the creator account based on a measure of an amount of digital social engagement generated in response to the social media posts, (3) determining that the social-engagement score surpasses a threshold, (4) in response to (i) the creator account having fewer than the designated number of followers and (ii) the social-engagement score surpassing the threshold, designating the creator account as a prioritized creator account, and (5) presenting, in association with the creator account, a digital visual indicator indicating that the creator account is a prioritized creator account. Various other methods, systems, and computer-readable media are also disclosed.

20 Claims, 11 Drawing Sheets

SYSTEMS AND METHODS FOR PRIORITIZING DIGITAL SOCIAL MEDIA POSTS WITHIN A SOCIAL MEDIA INTERFACE

CROSS-REFERENCE TO RELATED APPLICATIONS

This application claims the benefit of U.S. Application No. 63/396,477, filed 9 Aug. 2022, entitled "SYSTEMS AND METHODS FOR PRIORITIZING DIGITAL SOCIAL MEDIA POSTS WITHIN A SOCIAL MEDIA INTERFACE," the entire contents of which is incorporated by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
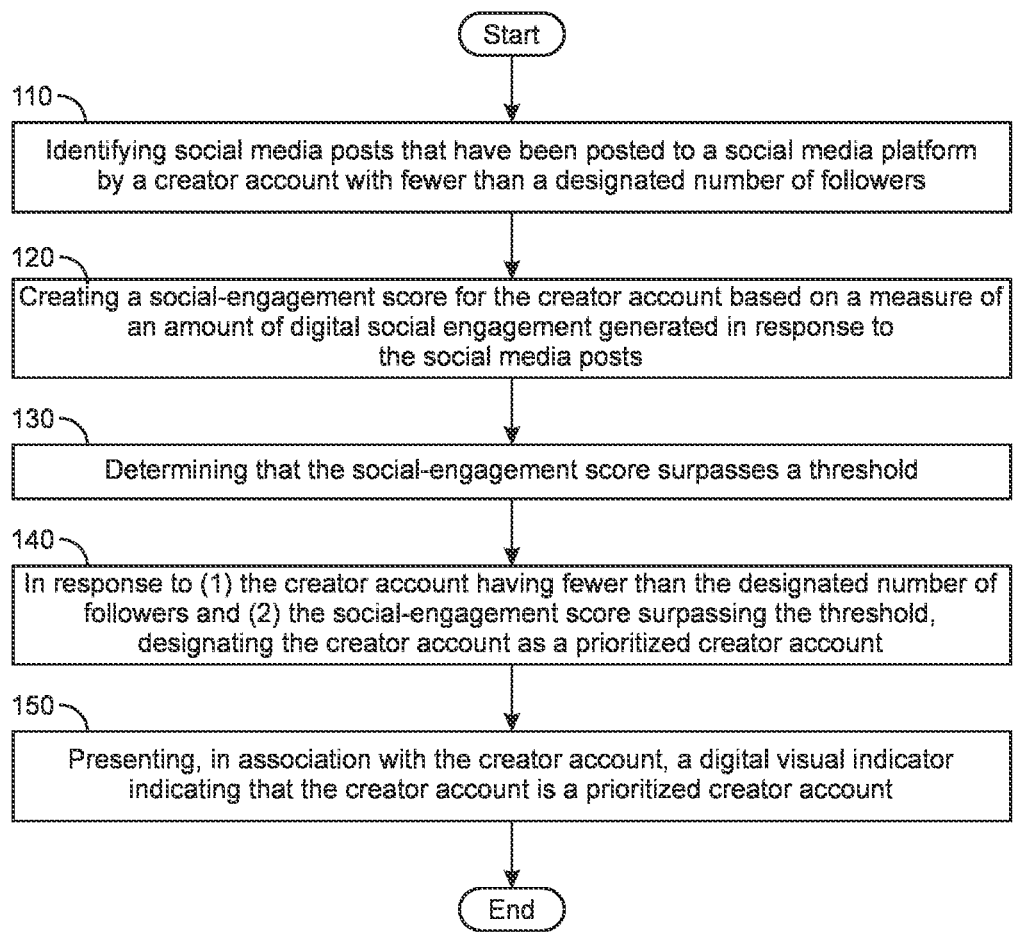
FIG. 1 is a flow diagram of an exemplary method for prioritizing digital social media posts within a social media interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a system for applying a "rising creator" label to new content creators (e.g., content creators with fewer than a threshold number of followers) whose content satisfies a designated success metric (e.g., engagements per view). In some examples, only content creators who satisfy certain criteria may qualify for the rising creator label (e.g., creators with above a threshold number of posts, creators who satisfy a posting frequency metric, creators who satisfy an originality and/or integrity metric, etc.). In some examples, the rising creator label may be applied dynamically. For example, the rising creator label may be applied for a designated period (e.g., one week), after which a content creator will be reevaluated for the rising creator label. An indicator of the rising creator label may be presented in a variety of digital locations (e.g., on a profile for the creator, on a post of the creator, in a strip of recommended posts and/or recommended content creators within a social media feed, etc.). In some examples, a congratulatory interface may be transmitted to a content creator informing the content creator of having received the rising creator label.

As will be explained in greater detail below, embodiments of the present disclosure may improve the field of social networking by improving data organization and data discovery. Embodiments of the present disclosure may improve a computer itself by improving data consumption flows and data organization.

The following will provide, with reference to FIG. 1, detailed descriptions of computer-implemented methods for prioritizing social media content. Detailed descriptions of corresponding example systems will also be provided in connection with FIG. 2. Detailed descriptions of interfaces and embodiments corresponding to the disclosed methods and systems will be provided in connection with FIGS. 3-13.

FIG. 1 is a flow diagram of an exemplary computer-implemented method 100. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (associated with a user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a social networking platform via an interface of the social networking platform. Examples of social networking may include, without limitation, text-based and/or image-based communication, video-based communication, audio-based communication, videoconferencing and/or audioconferencing, digital status broadcasting, private digital messaging, public content posting and/or commenting via a social media feed and/or a profile, etc. In some examples, server 202 may operate as part of and/or in connection with a social media platform 208. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, user 206 of user device 204 may be a user (e.g., a member) of a social networking platform (e.g., social media platform 208). In these examples, user device 204 may have installed an instance of a social media application 210, which may operate as part of social media platform 208 and through which one or more services provided by social media platform 208 (e.g., via server 202) may be accessible. In some examples, social media application 210 may be dedicated to a single service. For example, social media application 210 may represent a dedicated newsfeed application or a dedicated short-form video application. In other examples, social media application 210 may provide access to multiple services (e.g., a combination of two or more of the social networking services described below). In addition, or as an alternative, to social media application 210, user device 204 may have installed a browser that may navigate to one or more webpages through which the one or more services provided by social media platform 208 (e.g., via server 202) may also be accessible.

As mentioned above, social media platform 208 may provide a variety of services (e.g., platforms and/or frameworks) for the users within its network (e.g., via server 202 and/or social media application 210). For example, social media platform 208 may provide a newsfeed service. The term "newsfeed" may generally refer to any type or form of social media consumption channel, provided via an interface, that presents a scrollable collection of newsfeed posts. In some examples, a newsfeed may scroll (e.g., upward or downward) to reveal the different posts within the newsfeed (e.g., in response to receiving user scrolling input). In one example, the scrollable collection may include newsfeed posts created by contacts of a particular user (e.g., friends of the particular user) and/or other users that the particular user is following (i.e., connected content). Additionally, the newsfeed may include non-connected content (e.g., content created by users who are not contacts of the particular user).

Figure 3:
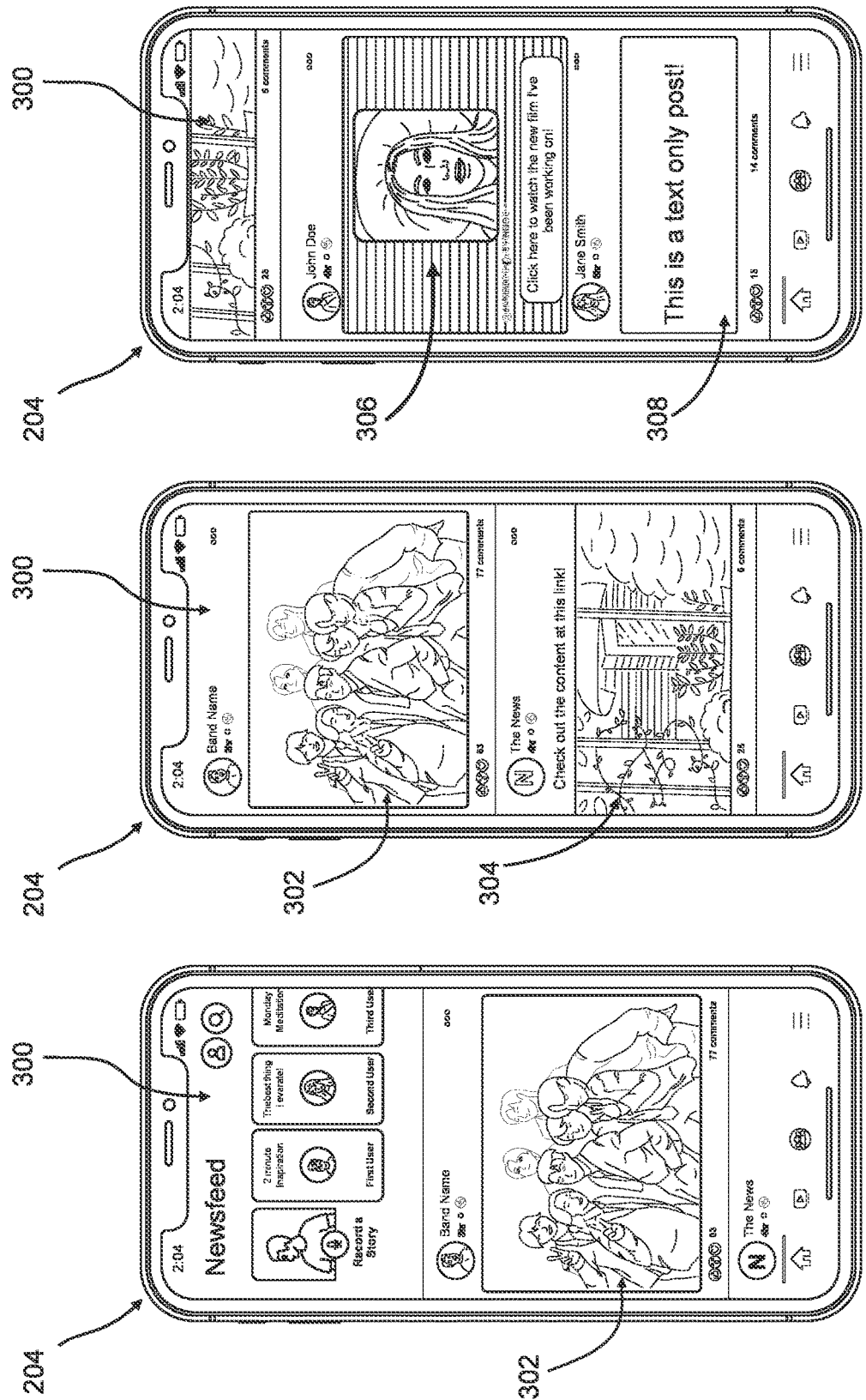
FIG. 3 is an illustration of an exemplary newsfeed interface.

The term "newsfeed post" generally refers to any type or form of digital composition that may be displayed in a newsfeed. Newsfeed posts may include a variety of content. For example, a newsfeed post may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes an image-based post 302, a link-based newsfeed post 304, a video-based newsfeed post 306, and a text-based newsfeed post 308.

In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed (and/or a menu corresponding to such information and/or features may be displayed) within the viewing pane (e.g., over the primary content), within the viewing pane and/or may be visually associated with the viewing pane (e.g., displayed beneath the viewing pane).

The newsfeed service may enable viewers of a newsfeed post to digitally respond to the newsfeed post in a variety of ways. In some examples, a newsfeed interface may enable a user to comment on a newsfeed post (e.g., via a text, image, and/or video-based reply) and may create a digital thread of comments corresponding to the newsfeed post (e.g., displayed beneath the newsfeed post and/or accessible via a comments affordance).

As another example, social media platform 208 may provide a digital stories service. The digital stories service may provide users with a digital stories feed, which presents a continuous series of digital story posts to a story-consumer, one by one (e.g., in a slideshow format). The term "digital story post" may generally refer to any type or form of digital composition intended for a digital stories feed. A digital story post may include a variety of content (e.g., a digital photograph, a graphic, text, a digital video, an artificial reality element, a digital audio recording, etc.). In one example, the story consumption channel may transition from presenting one digital story post to the next automatically, without requiring any user input to do so. In some examples, digital story posts from the same source (e.g., created and/or posted by the same user) may be grouped together, such that each digital story post from a particular source is displayed prior to displaying digital story posts from another source.

Figure 4:
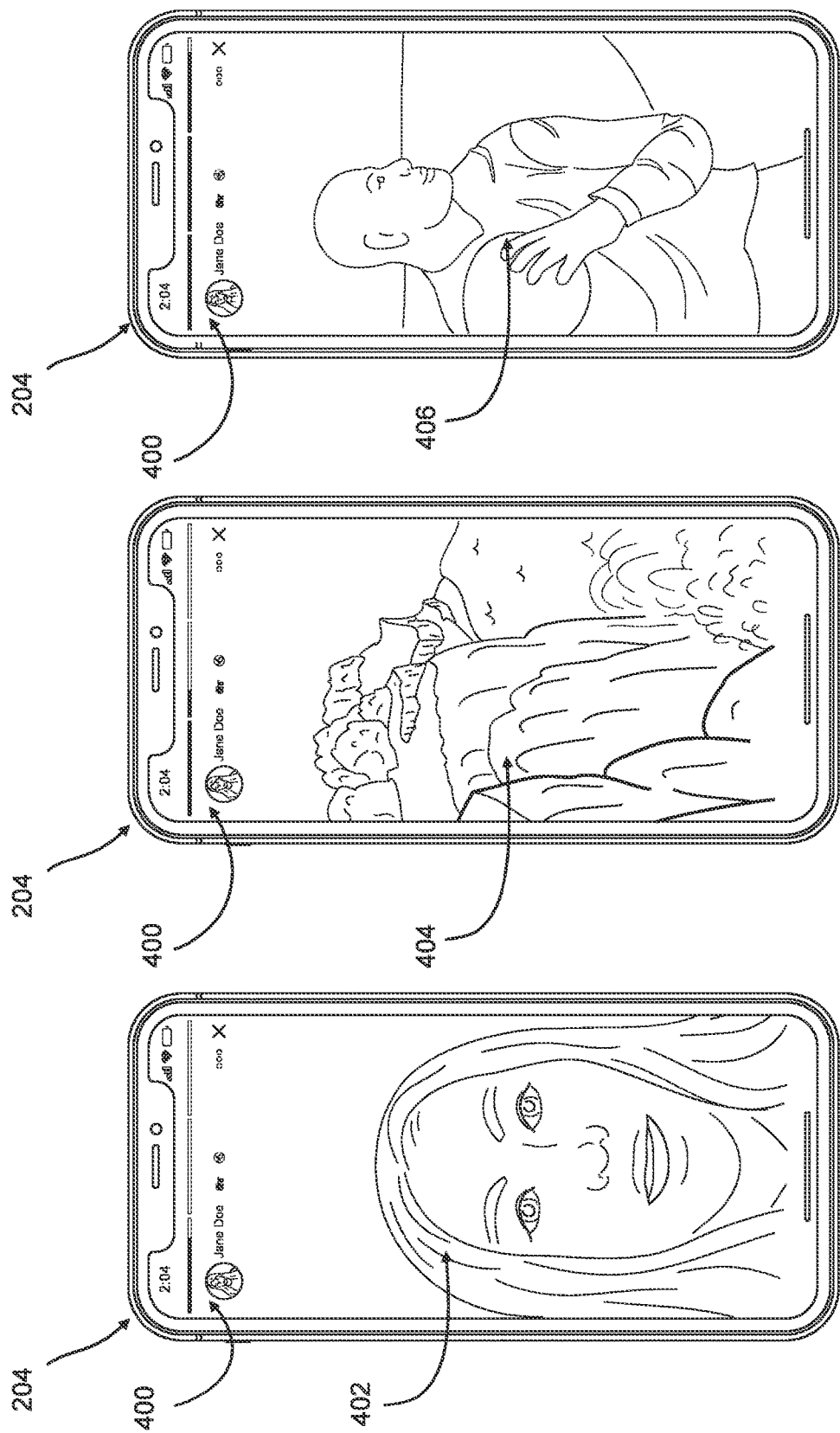
FIG. 4 is an illustration of an exemplary digital stories interface.

In one embodiment, a digital story post may be ephemeral. That is, the digital story post may only be viewable for a predetermined amount of time. For example, a digital story post may be set to disappear after twenty-four hours. Similar to the newsfeed service, the digital stories service may enable viewers of a story post to comment on the post, via a text and/or image-based reply and/or reply story, creating a digital thread of comments. Also similar to the newsfeed service, the digital stories service may configure a story feed for a particular user that includes connected content (e.g., story posts created by users who are contacts of the particular user or being followed by the particular user), non-connected content, or a determined ratio of connected content to non-connected content. FIG. 4 depicts an exemplary story interface 400 showing digital story posts 402, 404, and 406 of a user's digital story.

In some examples, social media platform 208 may provide a short-form video service (e.g., a reels service) that enables users to create short-form videos and/or consume (e.g., watch and/or digitally respond to) short-form videos created by other users. In one embodiment, social media platform 208 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., less than thirty seconds in length).

The term "short-form video feed" may generally refer to a series (e.g., a queue) of digital short-form videos (e.g., selected for a particular user) that social media application 210 (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In some examples, short-form videos may be continuously added to a user's short-form video feed as the short-form videos of the feed are consumed (e.g., such that a determined number of short-form videos are always in queue to be played).

Figure 5:
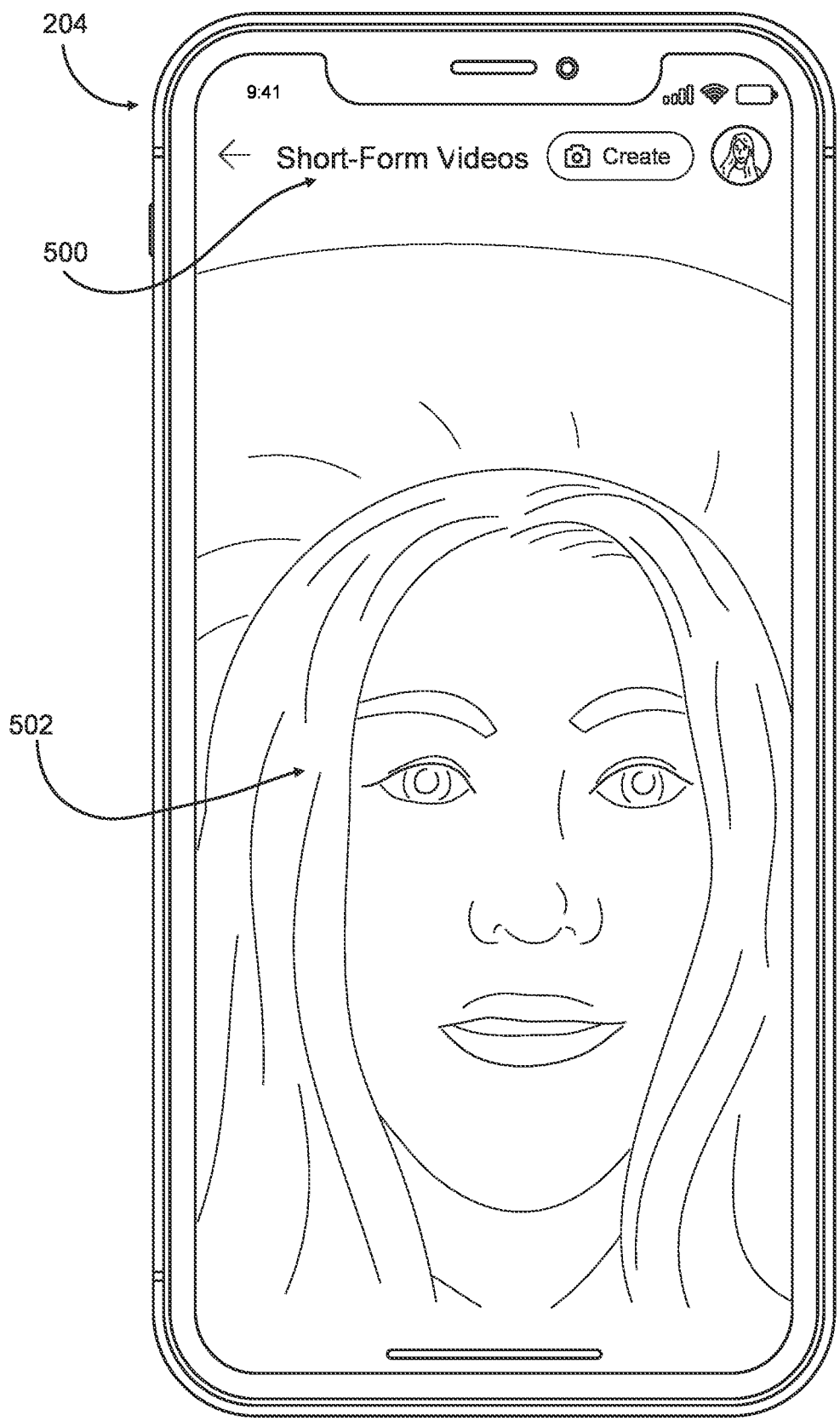
FIG. 5 is an illustration of an exemplary short-form video consumption interface.

In some examples, a short-form video feed may be presented via a dedicated short-form video feed interface. FIG. 5 depicts an exemplary dedicated short-form video feed interface 500 presenting a short-form video 502. Short-form videos may be selected for the short-form video feed of a particular user based on a variety of metrics. For example, a short-form video may be selected based on a topic the short-form video has been tagged with (e.g., in response to a determination that the particular user is interested in and/or predicted to be interested in the topic). As another example, a short-form video may be selected based on a user who created the short-form video (e.g., in response to a determination that the particular user is following the user and/or is predicted to be interested in content by the creator). As another example, a short-form video may be selected based on a popularity of the short-form video.

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

Figure 6:
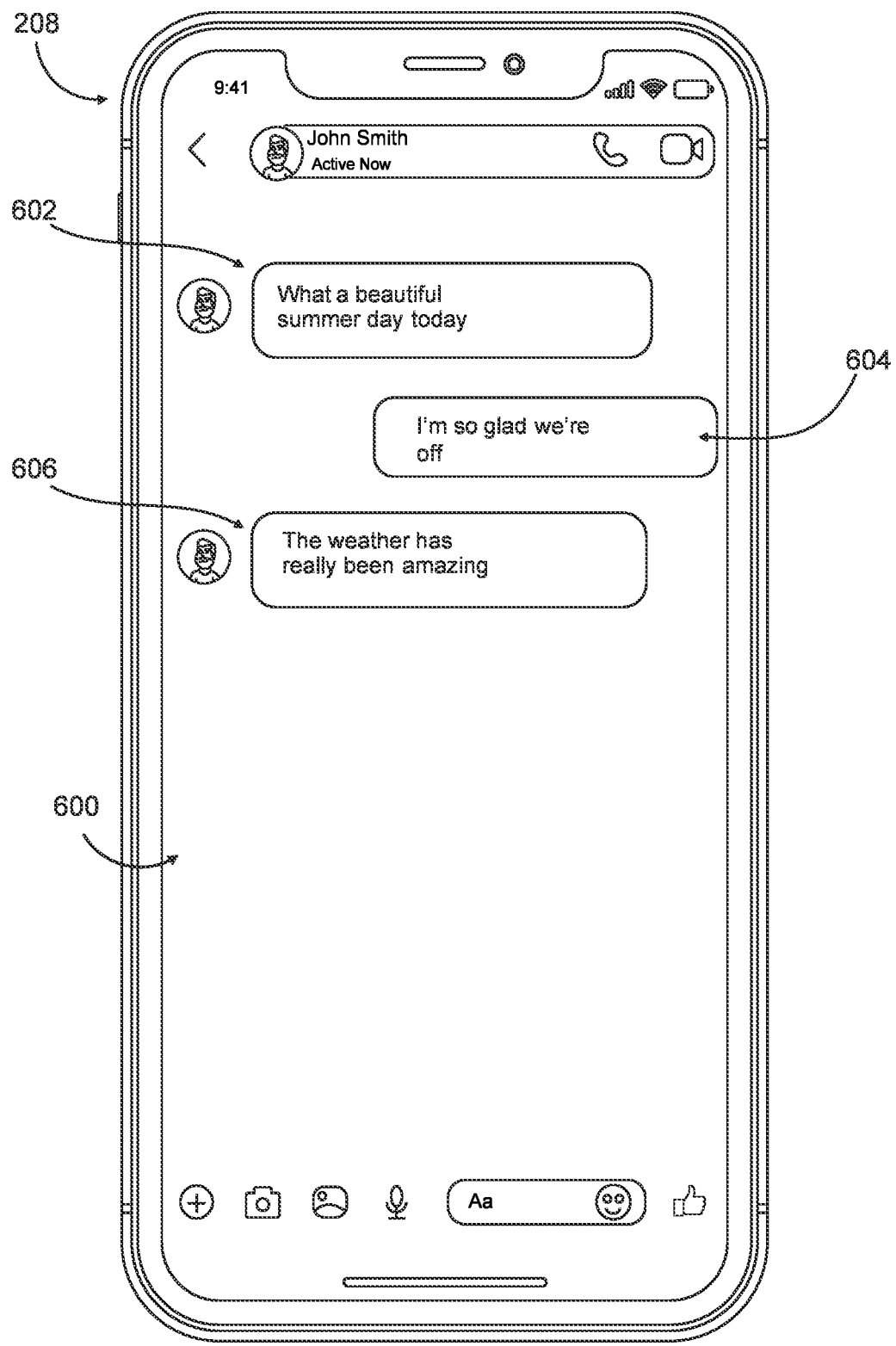
FIG. 6 is an illustration of an exemplary messaging interface.

In some examples, social media platform 208 may provide a messaging service. The term "messaging service" may generally refer to any type or form of digital message delivery system that enables users of social media platform 208 to exchange messages (e.g., text messages, audio messages, and/or video messages). FIG. 6 depicts an exemplary messaging interface 600 showing digital message posts 602, 604, and 606 of a digital messaging thread.

In some examples, social media platform 208 may maintain a content creator framework (e.g., service), which may be integrated with any of the other services described herein. A "content creator" generally refers to a user (e.g., who creates content for social media platform 208) who has designated himself, herself, or themselves as a content creator. In some examples, a content creator may be attempting to build a broad audience and/or to monetize the digital content that the content creator provides via social media platform 208.

In some examples, a user may designate himself, herself, and/or themselves as a content creator by creating a content creator account (e.g., via a digital account creation process) and/or by designating the user's user account as a content creator account (e.g., via a digital account management process). A content creator designation may trigger a variety of configurations for an account. In one example, a content creator account may automatically be designated as a public account (e.g., where posts created by the account are automatically posted to a public audience). As another example, a content creator account may be configured to be followed by other accounts (as opposed to being friended by other accounts). In some examples, posts of a content creator account may (e.g., in addition to being posted to the social media feeds of users following the content creator account) be configured to be posted to a feed of recommended content (e.g., a feed configured for a user who is not following the content creator account) and/or to a social media feed (e.g., a newsfeed, stories feed, and/or short-form video feed of a user who is not following the content creator account) as recommended content.

Content from a content creator may be selected for a particular user's social media feed in a variety of ways. In some examples, the disclosed systems may select, for a user's social media feed, content created by content creators whom the user is following. Additionally or alternatively, the disclosed systems may select, for a user, content created by a content creator whom the user is not following but who is predicted to be of interest to the user (e.g., based on the user's usage data, demographic data for the user, and/or a popularity and/or performance metric for the content creator). In one embodiment, content may be selected based on a content creator who created and/or posted the content having been designated as a prioritized creator account (e.g., as will be described below in connection with step 110 through step 150).

In some examples, social media platform 208 may provide a content creator account with tools (e.g., via a digital content creator studio) for posting, managing, monetizing, and/or measuring content posted across the services of social media platform 208. These tools may include an engagement-reward tool, directed to newer (e.g., upcoming) content creators, which will be described in greater detail below in connection with steps 110 through 150.

Figure 2:
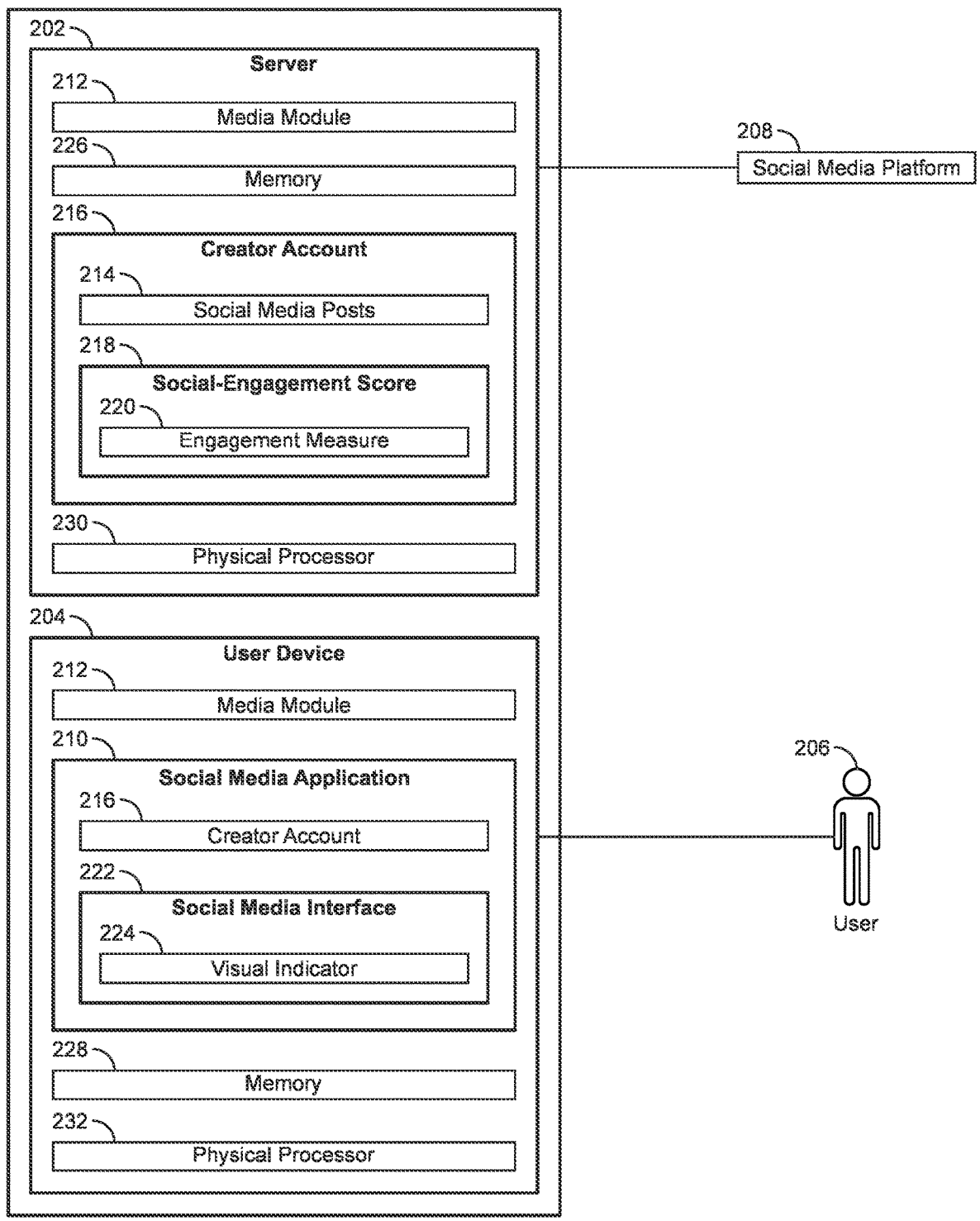
FIG. 2 is a block diagram of an exemplary for prioritizing digital social media posts within a social media interface.

Returning to FIG. 1, at step 110, one or more of the systems described herein may identify social media posts that have been posted to a social media platform by a creator account with fewer than a designated number of followers. For example, as illustrated in FIG. 2, a media module 212 may identify social media posts 214 that have been posted to social media platform 208 by a creator account 216 with fewer than a designated number of followers.

Creator account 216 generally represents a user account that has been designated as a content creator account (e.g., with one or more of the content creator features described just prior to this description of step 110). Creator account 216 may correspond to (e.g., may be maintained by) a user (e.g., user 206) who has been designated as a content creator.

Social media posts 214 generally represent any type or form of digital social media content (e.g., intended for a social media feed maintained by social media platform 208 such as a newsfeed, a stories feed, a short-form video feed, and/or a recommended content feed) created and/or posted by creator account 216. In some examples, social media posts 214 may include and/or represent non-connected content. The term "non-connected content" may refer to content (e.g., a social media post), posted to a consumption interface configured for a user (e.g., a user's social media feed), that was created by a use (e.g., a content creator) who is not a contact of the user.

In some examples, media module 212 may be configured to identify social media posts that were posted to social media platform 208 within a designated concluded time period (e.g., the last week). In these examples, social media posts 214 may represent social media posts that were posted within the designated concluded time period.

In additional or alternative examples, media module 212 may be configured to identify social media posts of content creators whose posts satisfy an originality metric and/or an integrity metric. In these examples, social media posts 214 may represent social media posts that satisfy the originality metric and/or integrity metric. In some such example, media module 212 may have evaluated each post within the identified social media posts 214 and each post may have been identified in response to satisfying the originality and/or integrity metric. In other examples, media module 212 may evaluate social media posts 214 in the aggregate. In these examples, social media posts 214 may represent every post posted by creator account 216 within the designated concluded time period and media module 212 may identify social media posts 214 in response to determining that, in the aggregate, social media posts 214 satisfy the originality and/or integrity metric (e.g., by determining that a threshold number and/or percentage of the posts within social media posts 214 satisfy the originality and/or integrity metric).

In some examples (e.g., in addition to being configured to only identify posts that were posted within a designated concluded time period and/or to being configured to only identify posts that satisfy an originality and/or integrity metric), media module 212 may be configured to only identify posts that were posted by newer and/or less-established content creator accounts (e.g., content creator accounts with fewer than a designated number of followers). In these examples, media module 212 may (1) have determined that creator account 216 has fewer than the designated number of followers and, based on the determination, (2) have identified social media posts 214 posted by creator account 216 within the designated concluded time period (e.g., the last seven days). Additionally or alternatively, media module 212 may be configured to only identify posts that were posted by a content creator account that satisfies a posting frequency metric (e.g., that a content creator account has posted more than a threshold number of social media posts and/or has posted social media posts at greater than a designated frequency within the designated concluded time period). In these examples, media module 212 may (1) have determined that creator account 216 has satisfied the posting frequency metric within the designated concluded time period and, based on the determination, (2) have identified social media posts 214 posted by creator account 216 within the designated concluded time period.

Returning to FIG. 1, at step 120, one or more of the systems described herein may create a social-engagement score for the creator account based on a measure of an amount of digital social engagement generated in response to the social media posts. For example, as illustrated in FIG. 2, media module 212 may create a social-engagement score 218 for creator account 216 based on an engagement measure 220 of social media posts 214.

Media module 212 may generate social-engagement score 218 in a variety of ways (e.g., based on a variety of factors). In some examples, media module 212 may generate social-engagement score 218 based on a number of digital social engagements posted in response to social media posts 214 by viewers of social media posts 214. In related examples, media module 212 may generate social-engagement score 218 based on a rate of digital social engagement per view. Examples of a digital social engagements may include a comment posted to a social media post, a posting or re-posting of a social media post, a digital mention of a social media post, a graphical response (e.g., an emoji) affixed to a social media post, and/or a number of clicks to a social media post. Additionally, media module 212 may generate social-engagement score 218 based on a number of clicks to a profile of creator account 216 and/or a number of searches for creator account 216 within a search engine of social media platform 208.

Returning to FIG. 1, at step 130, one or more of the systems described herein may determine that the social-engagement score surpasses a threshold. For example, as illustrated in FIG. 2, media module 212 may determine that social-engagement score 218 surpasses a threshold. In some examples, the threshold may be a static number. In these examples, the number of content creator accounts who surpass the threshold may vary (e.g., from week to week). In other examples, the threshold may be dynamically determined (based on a curve of all social-engagement scores generated for a particular time period). In some such examples, the threshold may vary but the number of content creator accounts who surpass the threshold may remain the same (e.g., from week to week).

At step 140, in response to (1) the creator account having fewer than the designated number of followers and (2) the social-engagement score surpassing the threshold, one or more of the systems described herein may designate the creator account as a prioritized creator account. For example, as illustrated in FIG. 2, media module 212 may designate creator account 216 as a prioritized creator account.

Media module 212 may designate creator account 216 as a prioritized creator account by applying any type or form of label to creator account 216 (e.g., a label that uses any terminology indicative of being prioritized and/or of excelling in some way). In some examples, media module 212 may apply a "Rising Creator" label to creator account 216.

Designating creator account 216 as a prioritized creator account may trigger a variety of actions. Returning to FIG. 1 for a specific example, at step 150, one or more of the systems described herein may (in response to prioritizing the creator account), present, in association with the creator account, a digital visual indicator indicating that the creator account is a prioritized creator account. For example, as illustrated in FIG. 2, media module 212 may present, in association with creator account 216 within a social media interface 222 maintained by social media platform 208, a visual indicator 224.

Visual indicator 224 may generally represent any type or form of digital visual element that indicates that a content creator account is prioritized. Visual indicator 224 may have any visual appearance. In some example, visual indicator 224 may include and/or represent text (e.g., a label such as "Rising Content Creator.") Additionally or alternatively, visual indicator 224 may include an illustration and/or graphic (of a shooting star), a filter and/or special effect (e.g., of confetti), a color (e.g., applied to text), etc.

Figure 8:
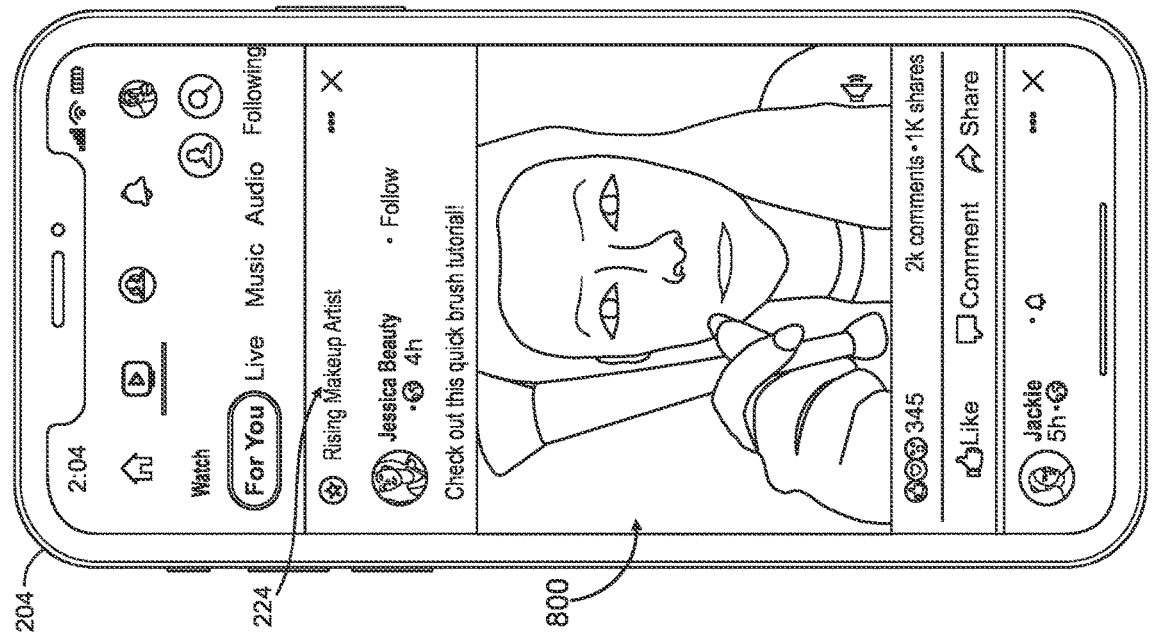
FIG. 8 is an illustration of an exemplary social media feed of recommended content.
Figure 7:
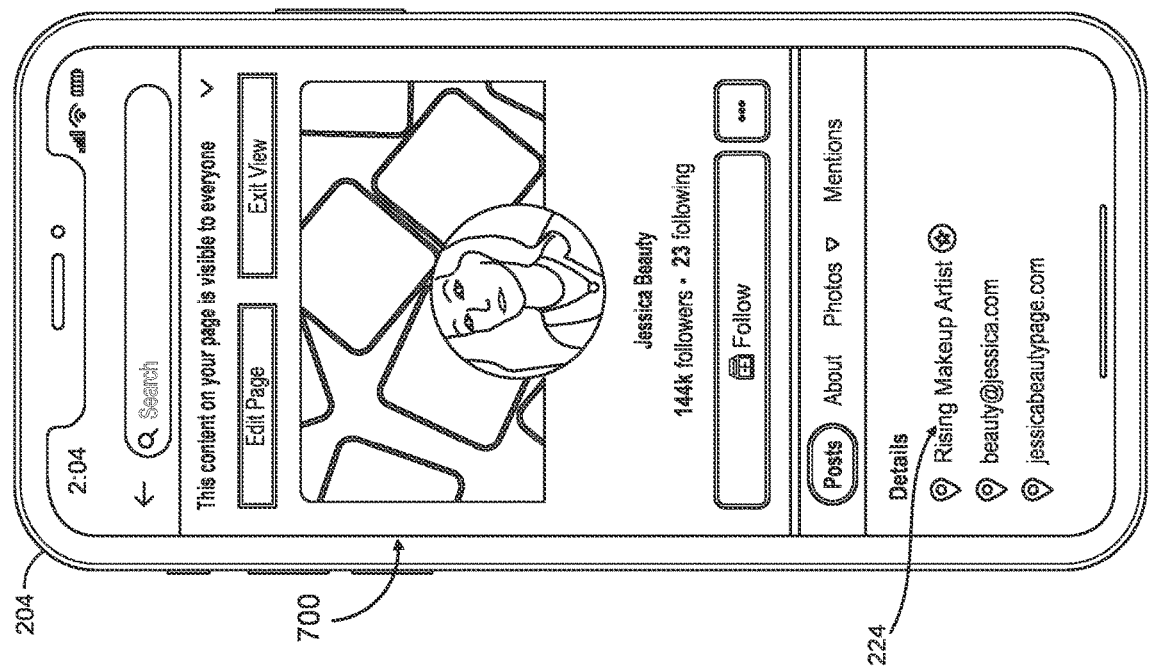
FIG. 7 is an illustration of an exemplary content creator profile.
Figure 9:
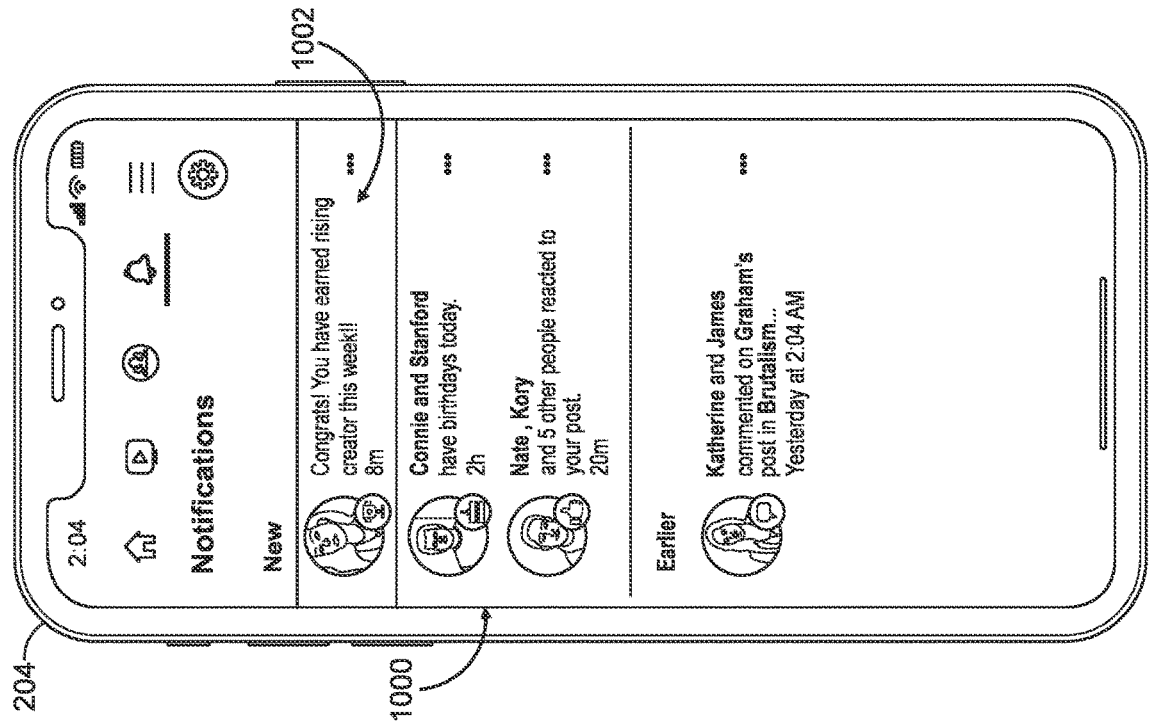
FIG. 9 is an illustration of the exemplary discovery interface with a recommended content creator to follow.

Media module 212 may present visual indicator 224 in a variety of contexts. In some examples, media module 212 may provide visual indicator 224 within a profile interface corresponding to creator account 216. Additionally or alternatively, media module 212 may provide visual indicator 224 within a social media post posted by creator account 216. FIG. 7 illustrates an exemplary profile page 700 of creator account 216 with visual indicator 224, FIG. 8 illustrates an exemplary social media post 800 with visual indicator 224, and FIG. 9 illustrates an exemplary discovery interface 900 (with a feed of recommended content) that includes visual indicator 224.

Figure 10:
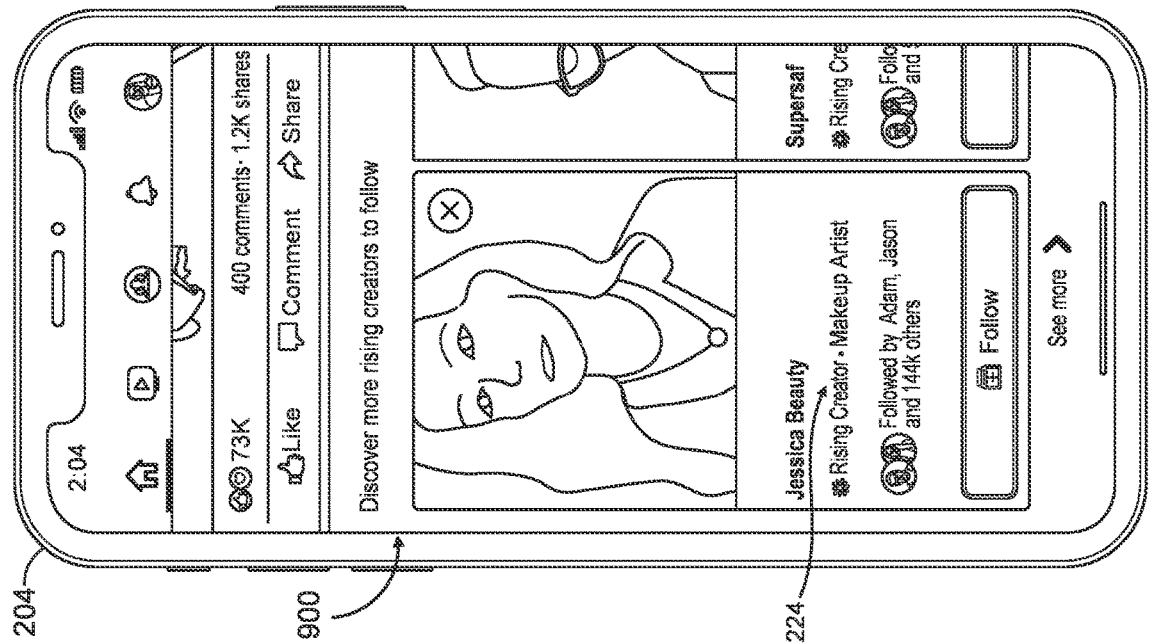
FIG. 10 is an illustration of an exemplary notifications page configured for a content creator.
Figure 11:
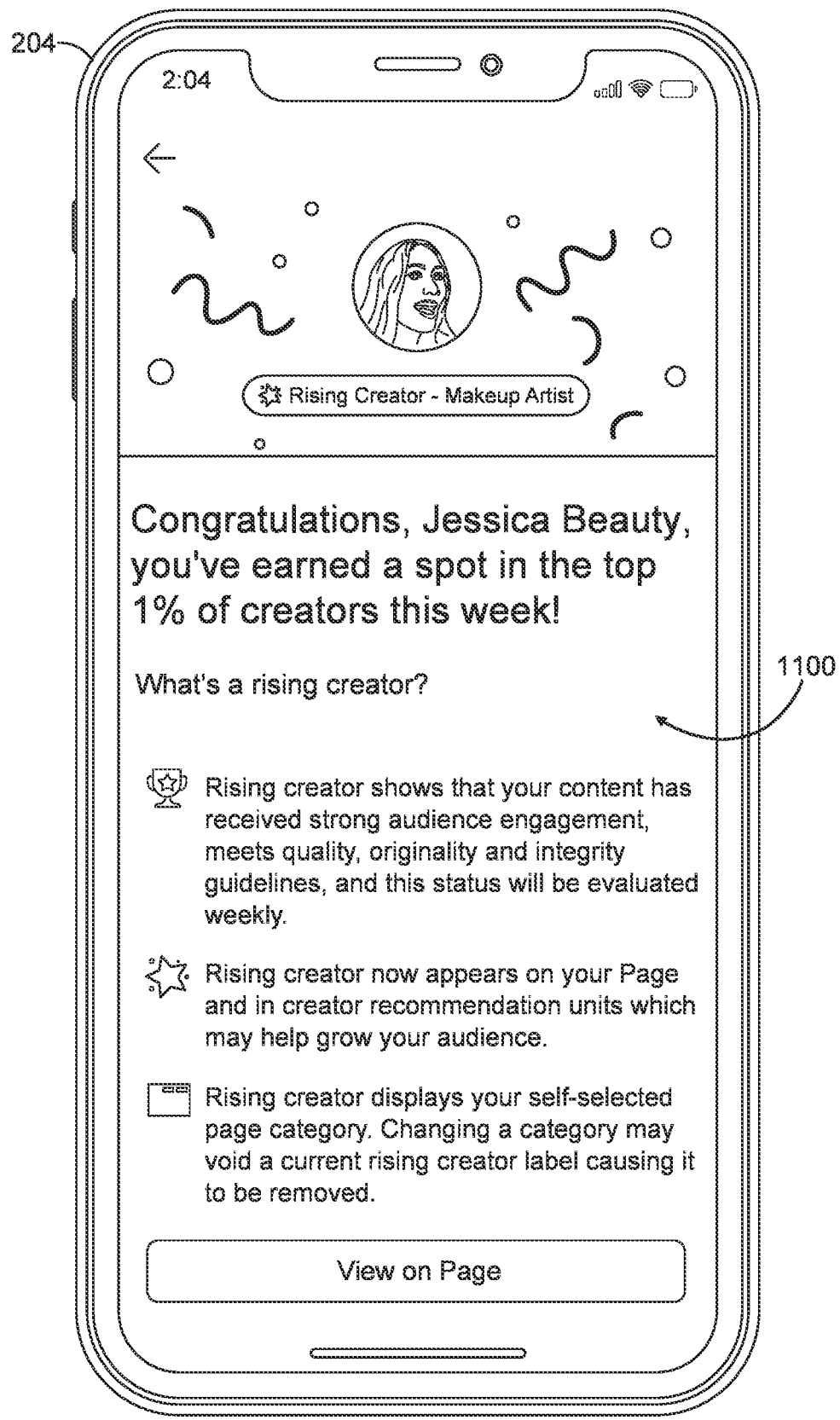
FIG. 11 is an illustration of an exemplary congratulatory interface notifying a content creator of having been designated as a prioritized account.
Figure 12:
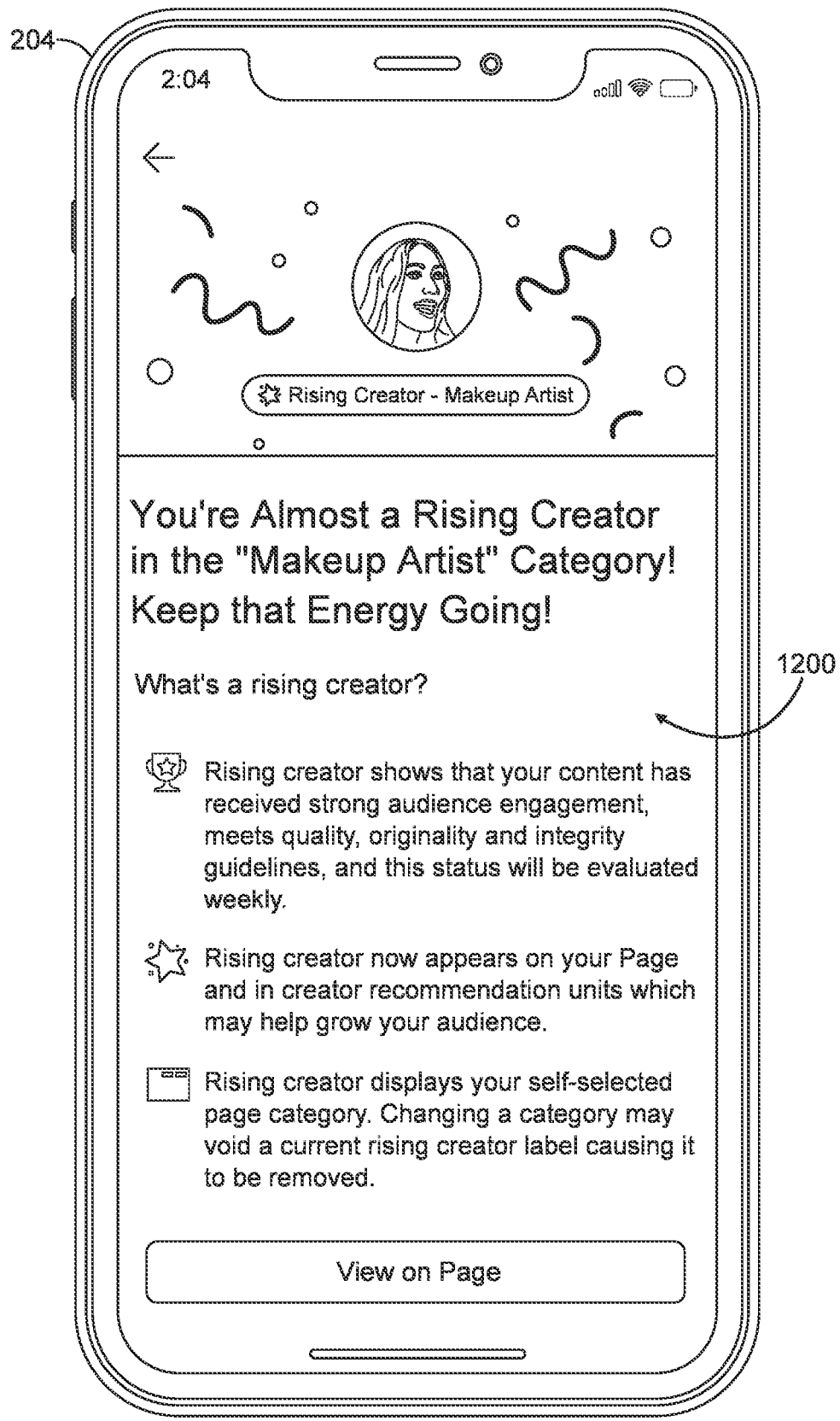
FIG. 12 is an illustration of an exemplary encouragement interface notifying a content creator of having almost been designated prioritized account.
Figure 13:
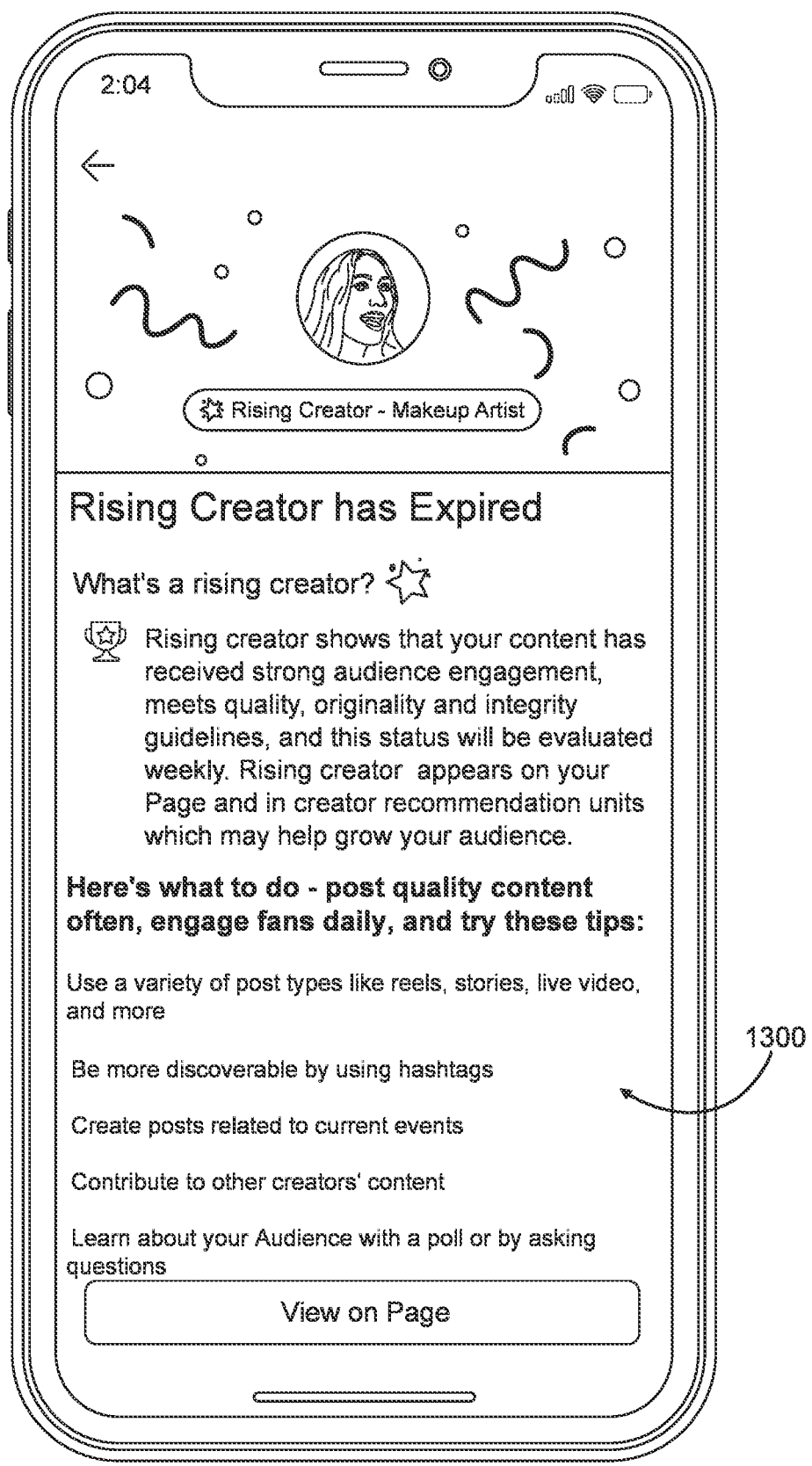
FIG. 13 is an illustration of an exemplary expiration interface notifying a content creator of having a prioritized designation expire.

In addition to presenting visual indicator 224, media module 212 may indicate to the content creator of creator account 216 that creator account 216 has been designated as a prioritized account. FIG. 10 illustrates an exemplary notifications page 1000 configured for creator account 216 with a notification 1002 that creator account 216 has been designated as a prioritized account. FIG. 11 illustrates an exemplary interface 1100 presented to creator account 216 with a congratulatory message indicating that creator account 216 has been designated as a prioritized account. In some examples in which media module 212 surfaces an interface with a congratulatory message, media module 212 may additionally surface an interface with a message to users who are within a designated range of the threshold (described at step 120), such as interface 1200 depicted in FIG. 12.

In some examples, media module 212 may additionally (in response to designating creator account 216 as a prioritized account) present a new social media post posted by creator account 216 to a stream of recommended posts within a social media consumption interface (e.g., within a social media feed and/or discovery interface). In one such example, the new social media post may be posted to a scrollable strip (e.g., stream) of posts posted by prioritized creator accounts (e.g., as depicted in FIG. 9).

In some examples, a prioritized designation may be used an input to a machine learning system configured to select recommended posts for a user's social media feed. In these examples, the machine learning system may be configured to prioritize posts from content creator accounts with a prioritized designation when selecting recommended posts for a user's social media feed (e.g., newsfeed, stories feed, short-form video feed, and/or feed of recommended content).

In some examples, there may be a time limit to the prioritized designation (e.g., one week). In these examples, media module 212 may perform one or more of the prioritized actions just described (e.g., presenting visual indicator 224 and/or prioritizing posts by creator account 216) for a designated future time period (e.g., one week). After the designated future time period is concluded, media module 212 may reevaluate the posts of creator account 216 (e.g., repeating steps 110-120). If media module 212 determines that creator account 216 no longer qualifies as a prioritized creator account (e.g., in response to determining that the number of followers of creator account 216 has increased to a number that is higher than the designated number or determining that a social-engagement score for the social media posts by creator account 216 has fallen to a score that falls below the threshold), media module 212 may adjust the prioritized actions accordingly (e.g., may remove visual indicator 224 from the digital places where it was previously presented). In some such examples, an interface may be provided to creator account 213 informing user 206 of no longer qualifying (e.g., an interface such as interface 1300 in FIG. 13). If, by contrast, media module 212 determines that creator account 216 continues to quality, media module 212 may repeat the prioritized actions discussed in connection with step 150.

User interfaces corresponding to the methods and systems described above may be surfaced as part of a variety of navigational flows (e.g., a variety of content discovery flows, social media consumption flows, and/or post creation flows). In some examples, a navigational flow may include a combination of user interfaces described herein and additional user interfaces not described herein. Each user interface described herein may be surfaced from a variety of entry points. In some examples, the user interfaces described here may be interconnected (e.g., with one interface navigating to another).

Each of the computer-mediated actions described herein may be performed by a module (e.g., media module 212) that operates within an endpoint device (e.g., user device 204) and/or that operates within a backend server (e.g., server 202). In the examples in which an action involves presenting digital content to a user via an endpoint device and/or receiving user input and/or digital feedback from the user to the endpoint device, the module may perform the action directly, in examples in which the module operates within the endpoint device (e.g., by displaying content via a display element of the endpoint, receiving tapping input to a touchscreen of the endpoint device, and/or receiving input to an auxiliary device communicatively coupled to the endpoint device such a digital mouse and/or a keyboard), and/or indirectly (e.g., in examples in which the module operates within the server). In examples in which a module performs an action indirectly, the module may perform the action in a variety of ways. For example, the module may perform the action by instructing the endpoint device to perform the action, by transmitting content to the endpoint device to be presented by the endpoint device, by providing the endpoint with an application (e.g., social media application 210) that performs the action, by receiving an indication of user input to the endpoint device from the endpoint device, etc. Additionally, in some examples, the module may perform an action operating in a combination of an endpoint device and a backend server.

In some of the embodiments described above, the disclosed systems may enable a user to create content (e.g., a social media post for a social media feed) via a content-creation interface (e.g., social media posts 214). In these embodiments, the content-creation interface may enable a content creation that includes a variety of types of content. Such content may include, without limitation, an image, a video, audio content, a graphic (e.g., a digital sticker), a special effect (e.g., an augmented reality effect), a filter, etc. The content-creation interface may enable a user to provide content (e.g., for a digital composition such as a post and/or message) in a variety of ways. In some examples, the content-creation interface may enable a user to create (e.g., generate) content via the content-creation interface. For example, the content-creation interface may include a digital canvas that enables a user to digitally draw content and/or may include a capture screen that enables the user to capture visual content via a camera of the user's device and/or audio content via a microphone of the user's device. As another example, the content-creation interface may include a text-input box that enables the user to input text (e.g., via typing input). Additionally or alternatively, the content-creation interface may enable the user to upload content. For example, the content-creation interface may include a drag-and-drop functionality and/or may present content (e.g., images stored in a camera roll of the user's device where permission to access the images has been provided) that may be selected to be included in the user's content creation. In addition to enabling a user to provide (e.g., create and/or upload) content, the content-creation interface may enable a user to modify (e.g., customize) content. For example, the content-creation interface may include a text-customization feature that enables a user to customize the appearance of text (e.g., selecting a size, color, font, and/or position of text). As another example, the content-creation interface may enable a user to select a filter and/or special effect to be applied over content.

In some of the embodiments described above, a module (e.g., media module 212) may select content for a user. For example, a module may select social media consumption content for a user (e.g., a social media composition for a social media feed and/or a social media feed relating to a particular topic or theme) and/or suggested additional users for a user (e.g., users with whom to co-view a social media feed, a digital group to join, etc.). In these embodiments, the module may select content for the user in a variety of ways. For example, social media consumption content may be selected based on a user history and/or demographic of the user (e.g., indicative of a user interest), user data relating to a contact of the user and/or users with a features in common with the user, a prioritization designation (as described above), etc. In some examples, content may be selected for a user by a machine learning system (e.g., a neural network).

In these examples, the machine learning system may select the content in response to receiving a variety of inputs. Such inputs may include inputs relating to the user (e.g., an input derived from a user history, an expressed user preference, etc.), inputs relating to users with a features in common with the user, inputs relating to a demographic and/or a region associated with the user, inputs derived from a social graph, inputs relating to potential content that may be selected for the user (e.g., a topic of such content, a popularity of such content, a prioritized designation of such content), etc.

EXAMPLE EMBODIMENTS

Example 1: A computer-implemented method may include (1) identifying social media posts that have been posted to a social media platform by a creator account with fewer than a designated number of followers, (2) creating a social-engagement score for the creator account based on a measure of an amount of digital social engagement generated in response to the social media posts, (3) determining that the social-engagement score surpasses a threshold, (4) in response to (i) the creator account having fewer than the designated number of followers and (ii) the social-engagement score surpassing the threshold, designating the creator account as a prioritized creator account, and (5) presenting, in association with the creator account, a digital visual indicator indicating that the creator account is a prioritized creator account.

Example 2: The computer-implemented method of example 1, where the measure of the amount of digital social engagement generated in response to the social media posts includes a number of digital social engagements posted by viewers of the social media posts.

Example 3: The computer-implemented method of examples 1-2, where the measure of the amount of digital social engagement generated in response to the social media posts includes the social media posts' rate of digital social engagement per view.

Example 4: The computer-implemented method of examples 1-3, where the digital social engagement generated in response to the social media posts includes a comment posted to a social media post, a posting or re-posting of a social media post, a digital mention of a social media post, a graphical response affixed to a social media post, and/or a number of clicks to a social media post.

Example 5: The computer-implemented method of examples 1-4, where the social-engagement score is further based on a number of clicks to a profile of the creator account and/or a number of searches for the creator account within a search engine of the social media platform.

Example 6: The computer-implemented method of examples 1-5, where the social media posts are presented as non-connected content within a social media consumption interface provided by the social media platform.

Example 7: The computer-implemented method of examples 1-6, where identifying the social media posts includes identifying social media posts that were posted to the social media platform within a designated concluded time period.

Example 8: The computer-implemented method of examples 1-7, where presenting the visual indicator includes presenting the visual indicator within new social media posts for a designated future time period.

Example 9: The computer-implemented method of example 8, further including, after the designated future time period has expired (1) determining that the creator account no longer qualifies as a prioritized creator account and (2) in response to determining that the creator account no longer qualifies, removing the visual indicator from being presented in association with the creator account.

Example 10: The computer-implemented method of example 9, where determining that the creator account no longer qualifies as a prioritized creator account includes (1) determining that the number of followers of the creator account has increased to a number that is higher than the designated number and/or (2) determining that the social-engagement score has fallen to a score that falls below the threshold.

Example 11: The computer-implemented method of examples 1-10, where identifying the social media posts that have been posted by the creator account with fewer than the designated number of followers further includes identifying the social media posts in response to (1) determining that the creator account satisfies a posting frequency metric, (2) determining that the social media posts satisfy an originality metric, and/or (3) determining that the social media posts satisfy an integrity metric.

Example 12: The computer-implemented method of examples 1-11, where presenting the visual indicator in association with the creator account includes providing the visual indicator within a profile interface corresponding to the creator account and/or providing the visual indicator within a social media post posted by the creator account.

Example 13: The computer-implemented method of examples 1-12, further including, in response to designating the creator account as a prioritized creator account, presenting a new social media post posted by the creator account to a stream of recommended posts within a social media consumption interface.

Example 14: The computer-implemented method of example 13, where the stream of recommended posts includes a stream of posts posted by prioritized creator accounts.

Example 15: A system for implementing the above-described method may include at least one physical processor and physical memory that includes computer-executable instructions that, when executed by the physical processor, cause the physical processor to (1) identify social media posts that have been posted to a social media platform by a creator account with fewer than a designated number of followers, (2) create a social-engagement score for the creator account based on a measure of an amount of digital social engagement generated in response to the social media posts, (3) determine that the social-engagement score surpasses a threshold, (4), in response to (i) the creator account having fewer than the designated number of followers and (ii) the social-engagement score surpassing the threshold, designate the creator account as a prioritized creator account, and (5) present, in association with the creator account, a digital visual indicator indicating that the creator account is a prioritized creator account.

Example 16: The system of example 15, where the measure of the amount of digital social engagement generated in response to the social media posts includes a number of digital social engagements posted by viewers of the social media posts.

Example 17: The system of examples 15-16, where the measure of the amount of digital social engagement generated in response to the social media posts includes the social media posts' rate of digital social engagement per view.

Example 18: The system of examples 15-17, where the digital social engagement generated in response to the social media posts includes a comment posted to a social media post, a posting or re-posting of a social media post, a digital mention of a social media post, a graphical response affixed to a social media post, and/or a number of clicks to a social media post.

Example 19: The system of examples 15-18, where the social-engagement score is further based on a number of clicks to a profile of the creator account and/or a number of searches for the creator account within a search engine of the social media platform.

Example 20: A non-transitory computer-readable medium may include one or more computer-readable instructions that, when executed by at least one processor of a computing device, cause the computing device to (1) identify social media posts that have been posted to a social media platform by a creator account with fewer than a designated number of followers, (2) create a social-engagement score for the creator account based on a measure of an amount of digital social engagement generated in response to the social media posts, (3) determine that the social-engagement score surpasses a threshold, (4), in response to (i) the creator account having fewer than the designated number of followers and (ii) the social-engagement score surpassing the threshold, designate the creator account as a prioritized creator account, and (5) present, in association with the creator account, a digital visual indicator indicating that the creator account is a prioritized creator account.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory devices 226 and 228 in FIG. 2) and at least one physical processor (e.g., physical processors 230 and 232 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying social media posts that have been posted to a social media platform by a creator account with fewer than a designated number of followers;
    creating a social-engagement score for the creator account based on a measure of an amount of digital social engagement generated in response to the social media posts;
    determining that the social-engagement score surpasses a threshold;
    in response to (1) the creator account having fewer than the designated number of followers and (2) the social-engagement score surpassing the threshold, designating the creator account as a prioritized creator account; and presenting, in association with the creator account, a digital visual indicator indicating that the creator account is a prioritized creator account.

2. The computer-implemented method of claim 1, wherein the measure of the amount of digital social engagement generated in response to the social media posts comprises a number of digital social engagements posted by viewers of the social media posts.

3. The computer-implemented method of claim 1, wherein the measure of the amount of digital social engagement generated in response to the social media posts comprises the social media posts' rate of digital social engagement per view.

4. The computer-implemented method of claim 1, wherein the digital social engagement generated in response to the social media posts comprises at least one of:
a comment posted to a social media post;
a posting or re-posting of a social media post;
a digital mention of a social media post;
a graphical response affixed to a social media post; or
a number of clicks to a social media post.

5. The computer-implemented method of claim 1, wherein the social-engagement score is further based on at least one of:
a number of clicks to a profile of the creator account; or
a number of searches for the creator account within a search engine of the social media platform.

6. The computer-implemented method of claim 1, wherein the social media posts are presented as non-connected content within a social media consumption interface provided by the social media platform.

7. The computer-implemented method of claim 1, wherein identifying the social media posts comprises identifying social media posts that were posted to the social media platform within a designated concluded time period.

8. The computer-implemented method of claim 1, wherein presenting the digital visual indicator comprises presenting the digital visual indicator within new social media posts for a designated future time period.

9. The computer-implemented method of claim 8, further comprising, after the designated future time period has expired:
determining that the creator account no longer qualifies as the prioritized creator account; and
in response to determining that the creator account no longer qualifies, removing the digital visual indicator from being presented in association with the creator account.

10. The computer-implemented method of claim 9, wherein determining that the creator account no longer qualifies as a prioritized creator account comprises at least one of (1) determining that a number of followers of the creator account has increased to a number that is higher than the designated number of followers or (2) determining that the social-engagement score has fallen to a score that falls below the threshold.

11. The computer-implemented method of claim 1, wherein identifying the social media posts that have been posted by the creator account with fewer than the designated number of followers further comprises identifying the social media posts in response to at least one of (1) determining that the creator account satisfies a posting frequency metric, (2) determining that the social media posts satisfy an originality metric, or (3) determining that the social media posts satisfy an integrity metric.

12. The computer-implemented method of claim 1, wherein presenting the digital visual indicator in association with the creator account comprises at least one of:
providing the digital visual indicator within a profile interface corresponding to the creator account; or
providing the digital visual indicator within a social media post posted by the creator account.

13. The computer-implemented method of claim 1, further comprising, in response to designating the creator account as a prioritized creator account, presenting a new social media post posted by the creator account to a stream of recommended posts within a social media consumption interface.

14. The computer-implemented method of claim 13, wherein the stream of recommended posts comprises a stream of posts posted by prioritized creator accounts.

15. A system comprising:
at least one physical processor; and
physical memory comprising computer-executable instructions that, when executed by the physical processor, cause the physical processor to:
identify social media posts that have been posted to a social media platform by a creator account with fewer than a designated number of followers;
create a social-engagement score for the creator account based on a measure of an amount of digital social engagement generated in response to the social media posts;
determine that the social-engagement score surpasses a threshold;
in response to (1) the creator account having fewer than the designated number of followers and (2) the social-engagement score surpassing the threshold, designate the creator account as a prioritized creator account; and
present, in association with the creator account, a digital visual indicator indicating that the creator account is a prioritized creator account.

16. The system of claim 15, wherein the measure of the amount of digital social engagement generated in response to the social media posts comprises a number of digital social engagements posted by viewers of the social media posts.

17. The system of claim 15, wherein the measure of the amount of digital social engagement generated in response to the social media posts comprises the social media posts' rate of digital social engagement per view.

18. The system of claim 15, wherein the digital social engagement generated in response to the social media posts comprises at least one of:
a comment posted to a social media post;
a posting or re-posting of a social media post;
a digital mention of a social media post;
a graphical response affixed to a social media post; or
a number of clicks to a social media post.

19. The system of claim 15, wherein the social-engagement score is further based on at least one of:
a number of clicks to a profile of the creator account; or
a number of searches for the creator account within a search engine of the social media platform.

20. A non-transitory computer-readable medium comprising one or more computer-readable instructions that, when executed by at least one processor of a computing device, cause the computing device to:
identify social media posts that have been posted to a social media platform by a creator account with fewer than a designated number of followers;

create a social-engagement score for the creator account based on a measure of an amount of digital social engagement generated in response to the social media posts;
determine that the social-engagement score surpasses a threshold;
in response to (1) the creator account having fewer than the designated number of followers and (2) the social-engagement score surpassing the threshold, designate the creator account as a prioritized creator account; and
present, in association with the creator account, a digital visual indicator indicating that the creator account is a prioritized creator account.

* * * * *